United States Patent [19]

Fujita et al.

[11] Patent Number: 5,029,667
[45] Date of Patent: Jul. 9, 1991

[54] POWER DRIVEN SUPPORT MECHANISM FOR TWO-WHEELED MOTOR VEHICLES

[75] Inventors: Haruyasu Fujita, Tokyo; Shinji Mitsuhara, Saitama, both of Japan

[73] Assignee: Honda Giken Kogyo Kabushiki Kaisha, Tokyo, Japan

[21] Appl. No.: 359,476

[22] Filed: May 31, 1989

[30] Foreign Application Priority Data

Sep. 5, 1988 [JP] Japan .................. 63-221976

[51] Int. Cl.⁵ .................. B62K 11/00; B62H 1/02
[52] U.S. Cl. .................. 180/219; 280/303
[58] Field of Search .................. 280/293, 301, 303; 180/219, 271

[56] References Cited

U.S. PATENT DOCUMENTS

| | | | |
|---|---|---|---|
| 3,758,736 | 9/1973 | Tanaka | 200/157 |
| 3,788,403 | 1/1974 | Mitchell | 74/50 X |
| 4,073,505 | 2/1978 | Yamazaki | 280/301 |
| 4,513,837 | 4/1985 | Archer | 280/293 X |
| 4,554,990 | 11/1985 | Kamiya et al. | 180/197 |
| 4,569,239 | 2/1986 | Shirley et al. | 180/179 X |
| 4,651,845 | 3/1987 | Yagasaki | 180/219 |
| 4,671,374 | 6/1987 | Kouyama et al. | 180/214 |
| 4,693,488 | 9/1987 | Bernocco | 280/293 |
| 4,724,921 | 2/1988 | Ohta et al. | 280/293 |
| 4,766,982 | 8/1988 | Hayashi et al. | 180/219 X |

FOREIGN PATENT DOCUMENTS 2174656 11/1986 United Kingdom .

Primary Examiner—Charles A. Marmor
Assistant Examiner—Alan M. Kagen
Attorney, Agent, or Firm—Lyon & Lyon

[57] ABSTRACT

The present invention is related to a power driven support mechanism for parked two-wheeled motor vehicles, in which the support member pivots between its upright and retracted position by activation of a support member drive mechanism. In particular, it concerns a support mechanism and its installation configuration, constructed in such a way as to eliminate the above described problems of exposure to the elements, diminished ground clearance, and excessive lateral bulk. By constructing the vehicle in such a manner that the under-chassis support material is caused to extend beyond the chassis in an interior and posterior direction, and furthermore, so that the anterior aspect of the power unit for applying driving force to the drive wheel (conventionally the rear wheel) is mounted on this protruding under-chassis support material, a space is created between the protruding under-chassis support material, the power unit, and the under-chassis. In the space thus established, the support member itself as well as the support member drive mechanism is installed, thereby eliminating problems of exposure to the elements and excessive external bulk.

5 Claims, 4 Drawing Sheets

POWER DRIVEN SUPPORT MECHANISM FOR TWO-WHEELED MOTOR VEHICLES

BACKGROUND OF THE INVENTION

Conventionally, two-wheeled motor vehicles have been equipped with a support mechanism for maintaining the vehicle in an upright horizontal position above the road surface when parked. Traditionally, the support member itself has been mounted on the underside of the vehicle's chassis, somewhat to the rear of the center part of the vehicle's front to rear longitudinal axis. Likewise, in the traditional vehicle, the drive mechanism for pivoting the support member between its retracted and upright position when activated has been mounted on the underside of the vehicle's chassis or on the side of the chassis.

However, this central area on the under side of the vehicle's chassis and to the rear of this area has generally been occupied by the engine or other power devices, the transmission, the power train, and/or associated auxillary devices. Accordingly, spatial interference from these devices has limited mounting arrangements for the support member and the support member drive mechanism.

Particularly, in those vehicles where a floor panal has been formed at the central part of the vehicle's chassis to provide foot rests, virtually no installation space remains for the support member and its drive mechanism. This problem is further aggravated in those vehicles where the engine, drive shaft, power train, and associated auxillary devices have been combined in a unified power unit installed towards the rear of the vehicle, in which case the support member drive mechanism must be installed in such a way that it juts out below or to the side of the vehicle. Accordingly, in such an arrangement, the support member drive mechanism is exposed to splattering mud, water, pebbles, and the like. In the case where the support member drive mechanism projects interiorly, it becomes difficult to maintain adequate road clearance. In the case where it projects laterally, the width of the vehicle is magnified. Thus, numerous difficulties which must be dealt with arise in such a configuration. The present invention proposes a means to resolve these installation problems.

SUMMARY OF THE INVENTION

The present invention concerns a power driven support mechanism for parked two-wheeled motor vehicles, in which the support member pivots between its upright and retracted postion by activation of a support member drive mechanism. In particular, it concerns a support mechanism and its installation configuration, constructed in such a way as to eliminate the above described problems of exposure to the elements, diminished ground clearance, and excessive lateral bulk.

By constructing the vehicle in such a manner that the under-chassis support material is caused to extend beyond the chassis in an interior and posterior direction, and furthermore, so that the anterior aspect of the power unit for applying driving force to the drive wheel (conventionally the rear wheel) is mounted on this protruding under-chassis support material, a space is created between the protruding under-chassis support material, the power unit, and the under-chassis. In the space thus established, the support member itself as well as the support member drive mechanism is installed, thereby eliminating problems of exposure to the elements and excessive external bulk.

DETAILED DESCRIPTION OF THE PREFERRED EMBODIMENTS OF THE INVENTION

Through reference to drawings 1–4, an example of the preferred embodiments of the present invention as applied to a motor scooter will be described in detail in the following section.

Figure 1:
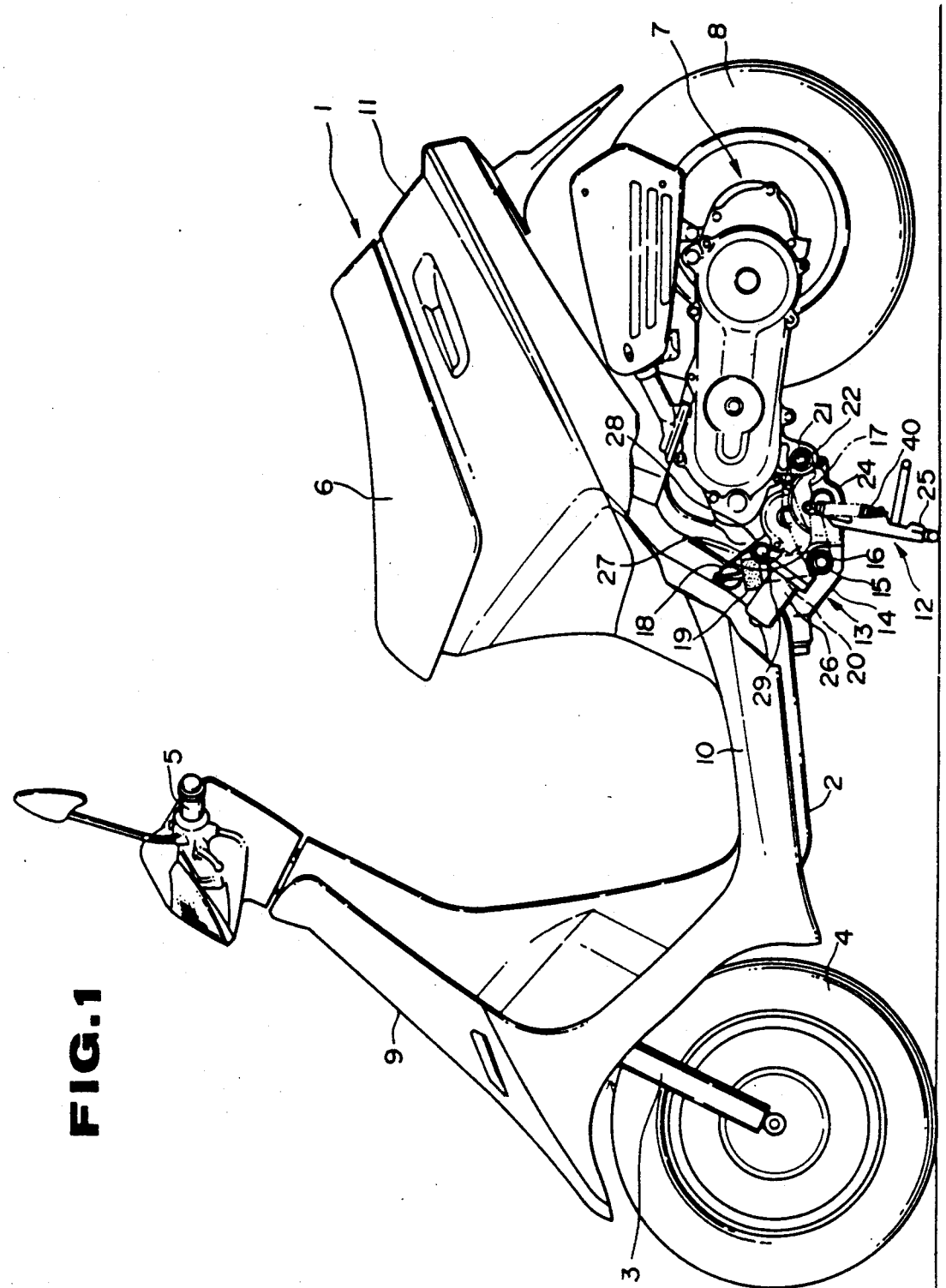
FIG. 1 represents a side view of the preferred embodiments of the invention as applied to a motor scooter.

In FIG. 1, a two-wheeled motor vehicle configured as a motor scooter is indicated by numeral 1. The chassis frame is indicated by numeral 2. Front fork 3 is rotatably attached to the anterior aspect of chassis frame 2. Front wheel 4 is freely rotatably installed on the lowermost aspect of front fork 3. Steering handle 5 is attached to the uppermost part of front fork 3. Seat 6 is attached to the upper-posterior aspect of chassis frame 2. Power unit 7 is installed on the lower-posterior aspect of chassis frame 2 so that it is free to pivot at its anterior connection in response to up-down motion of rear wheel 8 due to load or road stress. Rear wheel 8 is freely rotatably coupled to the posterior-medial aspect of power unit 7. Front cover 9 is installed so as to surround the upper portion of front fork 3 and the anterior portion of chassis frame 2. Likewise, the central portion of chassis frame 2 is similarly covered by front cover 9. Floor panel 10 forms the foot rests behind the lower part of front fork 3. A rear cover 11 is furnished which covers the the posterior portion of chassis frame 2 as well as the upper part of power unit 7. Connected between chassis frame 2 and the anterior part of power unit 7 is support mechanism 12, the concern of the present invention, which will be described in detail in the following section.

Figure 2:
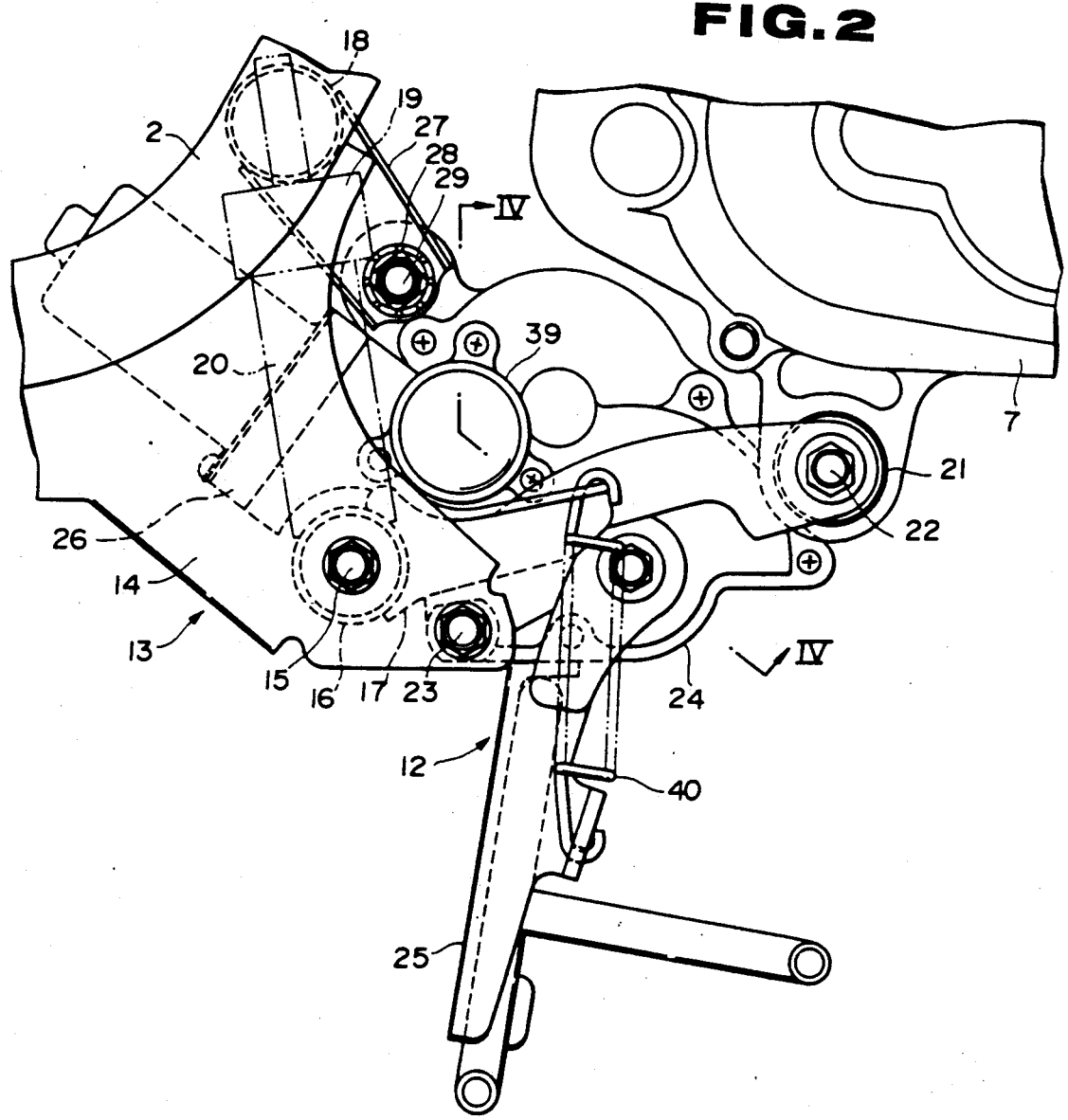
FIG. 2 represents a close-up view of FIG. 1, including the support member, the support member drive mechanism, and the adjacent portions of the power unit and under-chassis support material. Some more medially located hidden structures are indicated by dotted lines.

Power unit 7, positioned on the lower part of chassis frame 2 somewhat posterior to its central portion, connects to chassis frame 2 through the protruding under-chassis support material 13, extending from both right and left sides of the chassis in a posterior direction. A pair of brackets 14 is attached to the chassis frame 2 as part of the under-chassis support material 13, one bracket on each side (left and right) of the frame. Between the two brackets 14, is connected a pivot axle 15. A freely revolving pipe 16 is fitted so as to surround pivot axle 15. An arm 17 is attached to both ends of pipe 16, each arm extending towards the rear of the vehicle. A cross pipe 18 is installed on chassis frame 2 somewhat above and anterior to pipe 16. A stop 20 is fixed to the central portion of pipe 16. This stop 20 then projects upwards and somewhat to the front of the vehicle, connecting with cross pipe 18 via a rubber bumper 19. As indicated in FIG. 2, the power unit 7 is connected to the rearmost portion of each arm 17 via a rubber bushing 21 and bolt 22, so as to be freely rotatable.

A pivot axle 23 is installed between the pair of brackets 14 to which casing 24 is then attached so as to be freely rotatable. The support member 25 is installed on casing 24 so as to be freely rotatable within a fixed angle. This above mentioned support member 25, together with support member drive mechanism 26, which serves to pivot the support member 25 between its retracted position and upright position comprise support mechanism 12, the concern of the present invention. The casing 24 and support member drive mechanism 26 which are positioned somewhat posterior to chassis frame 2 between the central part of each arm 17, are thus installed in the space created and bounded by chassis frame 2, power unit 7, the protruding underchassis supporting material 13.

The casing 24 is suspended from cross pipe 18 by means of a bracket 27, which at one end is fixed to cross pipe 18, and at the other, attached to casing 24 via a rubber bushing 28 and a bolt 29 at a point on the casing 24 removed from pivot axel 23. Through rubber bushing 28, rotation of casing 24 about pivot axel 23 is limited to a prescribed angle.

Figure 3:
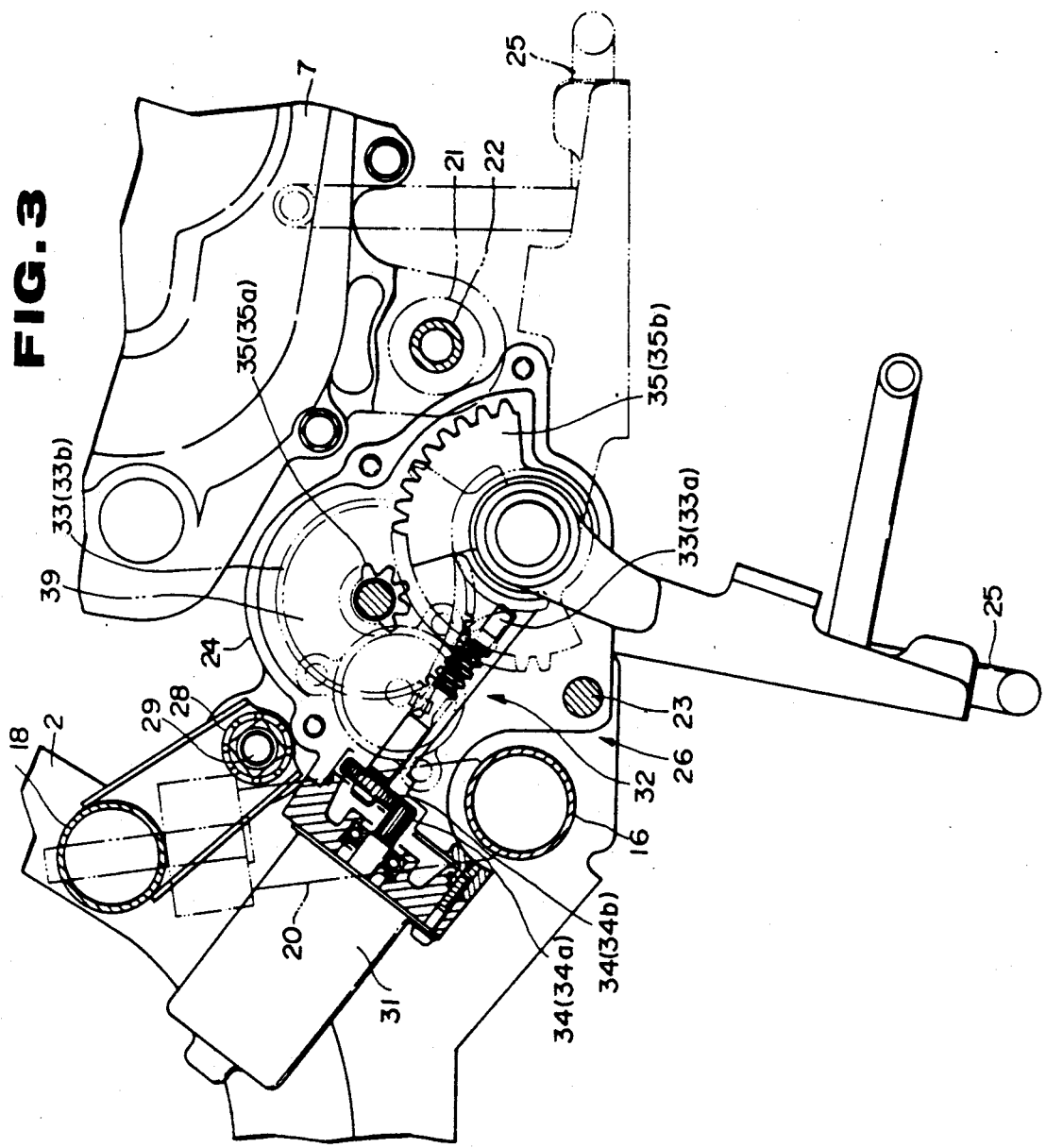
FIG. 3 represents a more medially placed section of the same view represented in FIG. 2, taken in the vertical plane parallel to the longitudinal axis of the vehicle, so that internal structures may be visualized.
Figure 4:
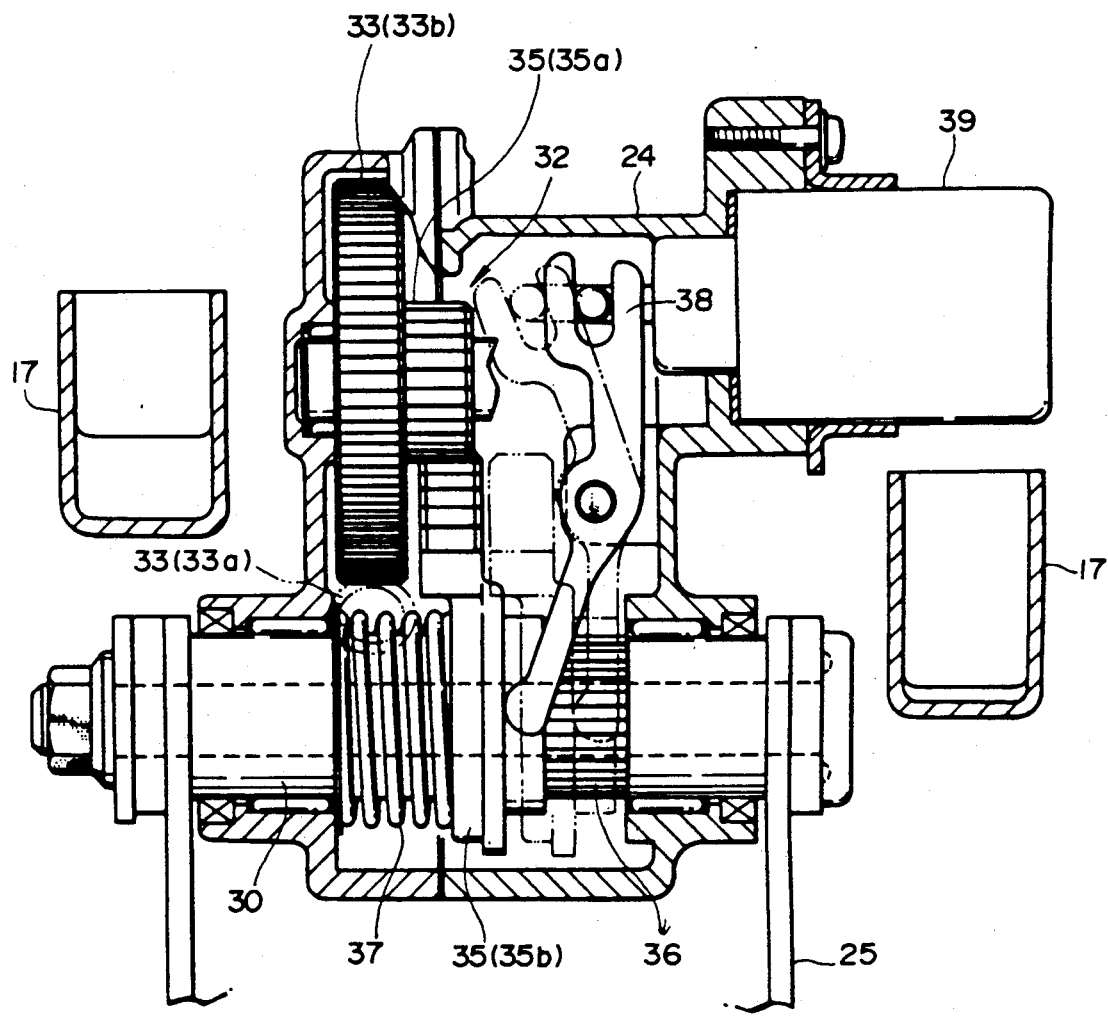
FIG. 4 represents a view of the support member drive mechanism taken in the vertical plane perpendicular to the longitudinal axis of the vehicle.

Referring to FIGS. 3 and 4, the support member drive mechanism 26 will be described in the following section. Drive axle 30, which is fixed to and rotates with support member 25, is attached to casing 24 so as to be freely rotatable. Electric drive motor 31, which supplies the torque to rotate drive axle 30 and support member 25, is located so that its axis of rotation lies roughly parallel to the longitudinal (front to back) axis of the vehicle, that is perpendicular to drive axle 30. Intervening between drive motor 31 and drive axle 30 is drive shaft 32.

The above mentioned drive shaft 32 is situated parallel to the rotor of drive motor 31. The rotor of drive motor 31 is fitted with a drive gear 34a which engages a driving gear 34b fitted on the adjacent end of drive shaft 32, thus forming a primary speed reduction gear train 34. Situated towards the opposite end of drive shaft 32, parallel to its longitudinal axis, is worm 33a. Worm 33a is engaged with worm wheel 33b, together forming worm drive 33. Drive gear 35a, which is situated on and coaxial with worm wheel 33b engages driving gear 35b to form a secondary speed reduction gear train 35. The above mentioned driving gear 35b is fitted on drive axle 30 in such a way that both are freely rotatable relative to the casing 24.

As seen in FIG. 3, when viewed from the side of the vehicle, driving gear 35b is formed in the shape of a fan. In the drawing, driving gear 35b is shown in the position corresponding to an upright support member 25 by solid lines. In the position corresponding to a retracted support member 25, driving gear 35b is shown by broken lines. Due to its fan shape, driving gear 35b disengages with drive gear 35a in both the fully upright and fully retracted positions, as can be seen from the drawing.

In the following section, a clutch mechanism provided by secondary speed reduction gear train 35 will be described with reference to FIG. 4. The above mentioned driving gear 35b is fitted on drive axel 30 in such a way that it free to slide along the longitudinal axis of the drive axle 30. A spline 36 is formed over the shaft of drive axle 30 in such a way that it engages driving gear 35b. By sliding on drive axle 30, driving gear 35b can be made to engage and disengage with drive gear 35a. Thus, the drive shaft 32 and the primary and secondary speed reduction gear trains 34 and 35 respectively form a transmission and clutch means by which torque may be intermittently transmitted from electric drive motor 31 to drive axle 30 and hence support member 25 as desired. In FIG. 4, driving gear 35b is shown in the engaged position by solid lines and in the disengaged position by broken lines.

A return spring 37 is located on drive axle 30 which maintains driving gear 35b in the disengaged position unless an opposing force is applied. A pivot arm 38 is attached by a pivot joint to casing 24. Its lower arm faces driving gear 35b opposite return spring 37 and is used to apply an opposing force to move driving gear 35b into its engaged position with drive gear 35a. Pivot arm 38 is attached by its upper arm to a solenoid 39 which when activated, pivots pivot arm 38, and thereby pushes driving gear 35b into its engaged position.

In the following section, the operating sequence of the present invention will be described. As described above, under ordinary conditions when solenoid 39 is not activated, driving gear 35b is disengaged from drive gear 35a. Therefore, drive axle 30, and accordingly support member 25, are freely and easily rotatable. The tension spring 40, illustrated in FIG. 1 and 2, which by applying tension along the longitudinal axis of support member 25, serves to maintain it in a given position, whether upright or retracted. When the vehicle is stopped, solenoid 39 may be activated, whereby pivot arm 38 is caused to pivot thus sliding driving gear 35b along spline 36 and causing it to engage with drive gear 35a. At the same time, drive motor 31 is activated and thus rotational force is applied to drive shaft 32 by the primary speed reduction gear train 34. This rotational force is likewise then applied by worm 33a to worm wheel 33b, and thence to drive axel 30 by the now engaged secondary speed reduction gear train made up of drive gear 35a and driving gear 35b. The support member 25 can thus be caused to pivot into its upright position.

What is claimed is:

1. A two wheeled vehicle comprising:
 a chassis frame having laterally spaced sides and an anterior aspect mounting a front form and an upwardly extruding posterior aspect mounting a seat;
 laterally spaced support brackets attached each to the respective sides of said chassis frame;
 a power unit for supplying power to a driving wheel of said vehicle;
 means for pivotally mounting said power unit to said support brackets including laterally spaced rearwardly extending arms each being pivotally connected at its anterior end to a support bracket and at its posterior end to said power unit, whereby a space is defined longitudinally between said chassis frame and said power unit; and
 a power driven support mechanism for said vehicle located in said longitudinal space, between said rearwardly extending arms, said support mechanism including:
 a support member drive mechanism including a casing mounted for limited pivotal movement by an axle whose opposite ends are attached each to one of said support brackets, said casing mounting an electric drive motor and housing a speed reduction mechanism operatively connected to said electric motor, and a retractable support member for selectively supporting said vehicle in an upright condition, said support member being operatively connected to said speed reduction mechanism and mounted in said casing for pivotal movement between angularly spaced retracted and extended positions.

2. The vehicle according to claim 1 in which the wheels thereof are spaced along the longitudinal axis of said chassis frame and in which said electric motor is disposed substantially over said chassis frame axis.

3. The vehicle according to claim 1 in which said speed reduction mechanism is a reduction gear train comprising:
- a worm gear;
- a drive gear rotatably driven by said worm gear;
- a driving gear driven by said drive gear; and
- a spline interconnecting said driving gear and said support member to effect rotation of said support member.

4. The vehicle according to claim 3 in which said drive gear and said driving gear are mounted for selected engagement or disengagement; and a solenoid operable to effect the selected engagement or disengagement between said drive gear and said driving gear.

5. The vehicle according to claim 3 in which said driving gear is fan shaped.

* * * * *